Figure 1:
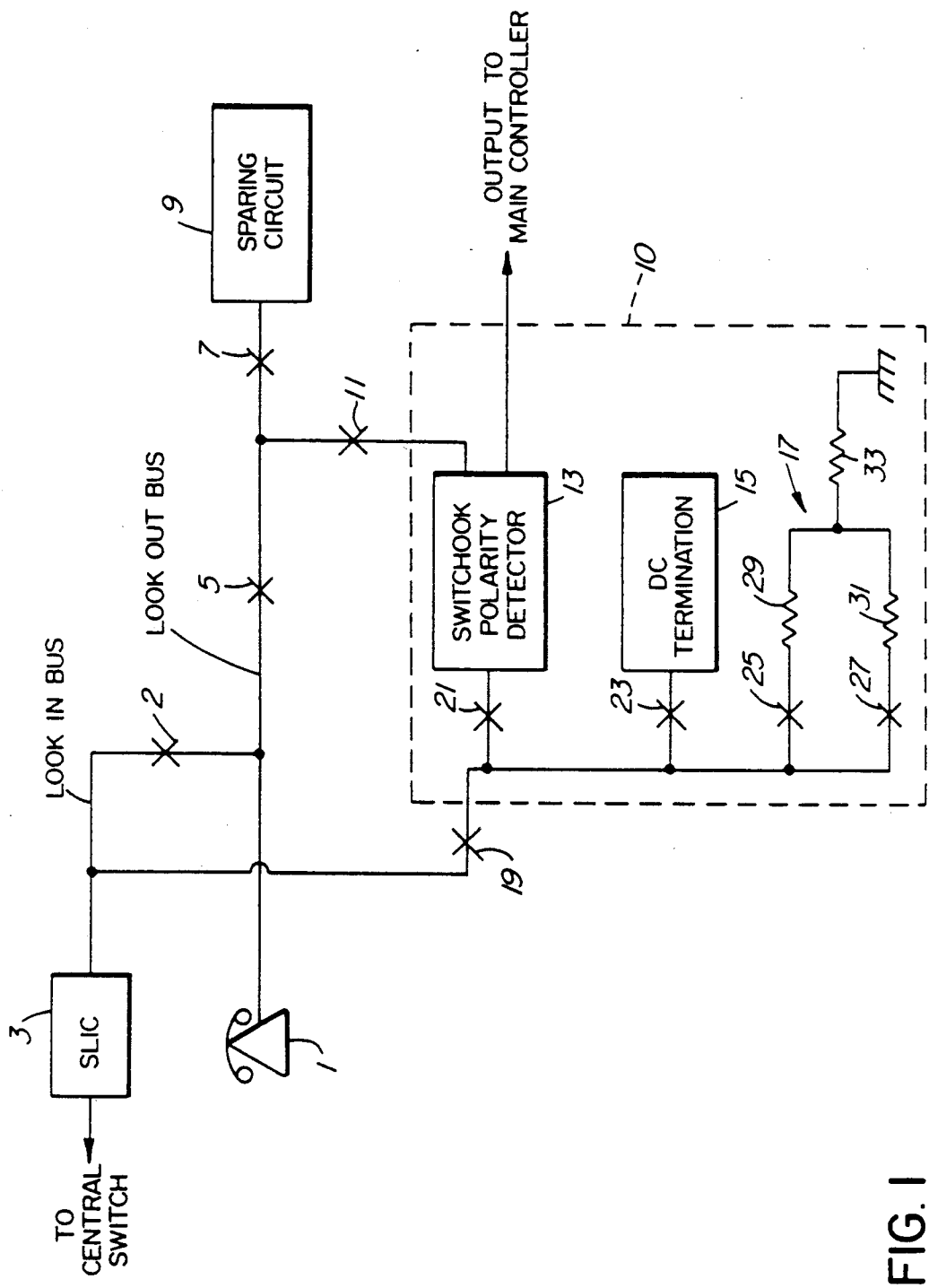

United States Patent [19]

Gray

[11] Patent Number: 4,996,702
[45] Date of Patent: Feb. 26, 1991

[54] APPARATUS FOR TESTING SPARE LINE CIRCUITS IN A COMMUNICATION SYSTEM

[75] Inventor: Thomas Gray, Kanata, Canada
[73] Assignee: Mitel Corporation, Kanata, Canada
[21] Appl. No.: 498,102
[22] Filed: Mar. 23, 1990
[30] Foreign Application Priority Data
Jun. 28, 1989 [CA] Canada ................................ 604279
[51] Int. Cl.[5] .......................................... H04M 1/24
[52] U.S. Cl. .......................................... 379/1; 379/27
[58] Field of Search .......................... 379/27, 1, 29, 24
[56] References Cited
U.S. PATENT DOCUMENTS
4,447,679  5/1984  Kojima et al. ...................... 379/29
4,860,332  8/1989  Chism ................................ 379/1

Primary Examiner—Stafford D. Schreyer
Attorney, Agent, or Firm—Laff, Whitesel Conte & Saret

[57] ABSTRACT

Apparatus and method for testing a sparing line circuit in a communication system, comprised of a test access concentrator circuit and relay circuitry for connecting the sparing line circuit thereto. The test access concentrator circuit includes a hookswitch polarity detector for detecting the presence of DC battery feed current flowing from the sparing line circuit, and the direction of flow of battery current, and termination circuitry for providing one of either a DC or ANI termination to the sparing line circuit for sinking the DC battery supply current. Signal outputs from the hookswitch polarity detector circuit provide an indication of whether or not the sparing line circuit is present, and if so whether the sparing line circuit has been connected with correct polarity.

14 Claims, 2 Drawing Sheets

APPARATUS FOR TESTING SPARE LINE CIRCUITS IN A COMMUNICATION SYSTEM

The present invention relates in general to communication systems and more particularly to an apparatus and method for testing a sparing line circuit within a central office exchange.

Large telecommunications switching facilities such as central office exchanges are typically comprised of a plurality of line circuits connected to a central crosspoint switching matrix and to respective remote peripherals such as subscriber sets. For example, in a typical central office exchange servicing a small to medium-sized community, there may be thousands of such line circuits connected to remote subscriber sets in individual households, etc. In the event that one of the central office line circuits fails, one or more sparing line circuits are typically provided which can be connected between the remote subscriber set and the central crosspoint switching matrix in place of the defective subscriber line circuit.

According to prior art systems, a technician at the central office exchange was typically required to manually substitute the sparing line circuit for the malfunctioning subscriber line circuit. This was effected by actuating one or more switches for rerouting the signal path from the subscriber set through the sparing line circuit instead of the defective subscriber line circuit.

It has been found that sparing line circuits are used only very rarely within a central office exchange (i.e. typically once every two years).

Sometimes the sparing line circuits malfunction or fail while sitting idle, and sometimes a craftsman working at the central office inadvertently disconnects the circuits, and no one knows of these circumstances until the sparing line circuits are needed, months later. In the event of a malfunction or disconnection of the sparing line circuits, there has been no procedure for ascertaining whether or not the sparing line circuit will function prior to being substituted for a defective subscriber line circuit, as discussed above. In the event that the central office exchange is located remote from the nearest test center (i.e. 500 miles or more away), the cost of sending a technician to the central office exchange for testing the sparing line circuit and connecting it to the defective subscriber line circuit could be exceedingly high.

According to the present invention, an apparatus and method are provided for remote testing of a sparing line circuit within a central office exchange in order to ascertain whether or not the sparing line circuit has been properly connected prior to substituting the sparing line circuit for a defective subscriber line circuit, without requiring a skilled technician to visit the remote central office exchange.

Thus, according to the present invention test personnel are provided with an apparatus and method for ascertaining from a remote test site the operating condition of one or more sparing line circuits before a sparing line circuit is required to be put in service.

In general, according to the present invention there is provided apparatus for testing a sparing line circuit adapted for connection to a communication system. The apparatus is comprised of a first circuit for receiving and terminating battery current supplied by the sparing line circuit, a second circuit for detecting the presence of the battery current received and terminated by the first circuit and in response generating a first signal representative thereof, and a third circuit for detecting the direction of flow of the battery current and in response generating a second signal representative thereof. The first signal provides an indication of whether or not the sparing line circuit is connected to the communication system, and the second signal provides an indication of whether or not the sparing line circuit has been connected with correct polarity.

According to the present invention, there is also provided a method for testing a sparing line circuit adapted for connection to a communication system, comprising the steps of receiving and terminating battery current supplied by the sparing line circuit, detecting the presence of the battery current supplied by the sparing line circuit and generating a first signal representative thereof, and detecting the polarity of the battery current and in response generating a second signal representative thereof. The first signal of the inventive method provides an indication of whether or not the sparing line circuit is connected to the communication system, and the second signal provides an indication of whether or not the sparing line circuit has been connected with correct polarity.

Figure 2:
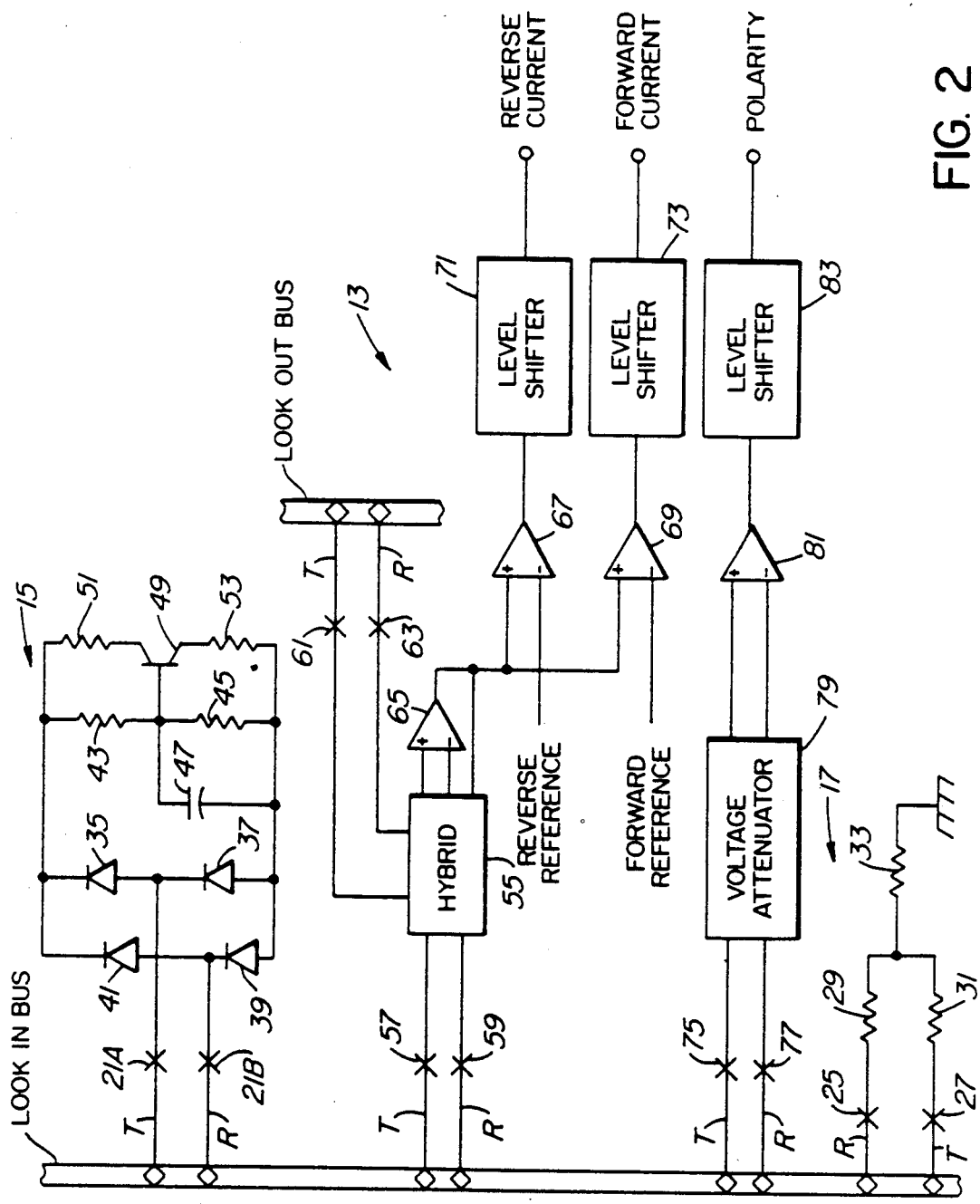

A better understanding of the present invention will be obtained with reference to the detailed description below in conjunction with the following drawings, in which:

FIG. 1 is a block schematic diagram of an apparatus for testing a sparing line circuit in accordance with the present invention in its most general form; and FIG. 2 is a schematic diagram illustrating hookswitch polarity detector, DC termination and ANI termination circuitry of FIG. 1 according to a preferred embodiment of the present invention.

Turning to FIG. 1, a remote peripheral such as a subscriber set 1 is shown connected via a relay contact 2 to a subscriber line interface circuit (SLIC) 3 of the central office exchange. The subscriber line interface circuit 3 is connected to relay contact 2 via a LOOK IN BUS and to a central crosspoint switching matrix of the central office exchange (not shown).

The subscriber set 1 is also connected to a LOOK OUT BUS and via relay contacts 5 and 7 may also be connected to a sparing line circuit 9.

Although only a single subscriber set 1 and associated line circuit 2 are illustrated for the purpose of example, a typical central office exchange may include several thousands of such circuits.

The sparing line circuit 9 may be connected to a test access concentrator circuit 10 via the LOOK OUT BUS and relay contacts 7 and 11. Although only one sparing circuit line is shown, in a typical configuration, two or more sparing circuits may be connected to respective LOOK OUT BUS lines via respective additional relays. The test access concentrator circuit 10 is comprised of a hookswitch polarity detector 13, DC termination 15 and ANI termination 17, as will be discussed in greater detail below with reference to FIG. 2.

Likewise, the subscriber line interface circuit 3 may be connected to the test access concentrator circuit 10 via the LOOK IN BUS and a further relay contact 19.

In accordance with the circuitry of FIG. 1, it is possible for the test access concentrator circuit 10 to isolate the subscriber line interface circuit 3 from a subscriber loop connected to the remote peripheral (i.e. subscriber set 1) and to substitute the sparing line circuit 9 in place of a defective line circuit 3. Software running on the central office exchange main controller (not shown) can then assign the directory number associated with subscriber line interface circuit 3 to the substitute sparing line circuit 9, as well as class of service and any other attributes of the subscriber's line. This can all be done by maintenance commands from a terminal remote from the central office exchange such that service can be restored to a subscriber suffering from a defective subscriber line interface circuit 3 without requiring technical personnel to travel from a remote test site to the central office exchange.

However, as discussed above, since the sparing line circuit 9 is used very infrequently and is susceptable to malfunctioning, the test access concentrator circuit 10 is provided for periodic testing of the sparing line circuit 9 in order to discover any such malfunction and thereby allow for repair of the sparing line circuit during regular periodic maintenance of the central office exchange, prior to any requirement for connection of the sparing line circuit in an emergency situation.

There are three malfunctions possible when wiring a sparing line circuit into the communication system. Namely, sparing line circuit 9 may not be connected at all, the wrong sparing line circuit may be connected where more than one is provided, or the sparing line circuit may be wired with incorrect polarity.

In operation, presence of the sparing line circuit 9 may be checked by operating relay contacts 11, 21 and one of either 23 or 25, and 27. The sparing line circuit 9 is thereby terminated with a DC termination 15 through series connected hookswitch polarity detector 13. The hookswitch current polarity detector 13 produces logic output signals to the main central office controller, as described below with reference to FIG. 2, which indicates battery current flowing either from or to the sparing line circuit 9 above a predetermined threshold current level. The detector 13 also produces a further logic output signal which indicates the polarity of the battery current.

Thus, the three possible wiring malfunctions discussed above may be determined as follows. In the event that hookswitch polarity detector 13 indicates that no battery current is flowing therethrough, then it is known that the sparing line circuit 9 has not been connected. The central office main controller then examines indicator outputs of the sparing line circuit 9 to determine whether the line circuit is detecting current drawn by the DC termination 15. If it is not detecting current, then the sparing line circuit is not connected properly Since the hookswitch polarity detector 13 draws current, the aforementioned controller notes that an unexpected circuit of some kind is connected. The controller next scans all of the line circuits to discover which one is actually supplying the current, and reports the results to the remotely located maintenance personnel. Once located, if the located current is not otherwise in use, it can be established as the sparing line circuit to be used by the system by remote commands from maintenance personnel. If this circuit is servicing a subscriber, it can be deleted from a sparing circuit list so that the subscriber is not inconvenienced by further testing.

In the event that tip and ring leads of the sparing line circuit 9 are connected in reverse, the hookswitch polarity detector 13 will indicate a subscriber line reversal. This is important information since touch-tone telephones will not operate with reversed tip and ring leads.

The ANI termination 17 is shown comprised of two parallel resistors 29 and 31 respectively in series with relay contacts 25 and 27, connected through a series resistor 33 to ground. The ANI termination 17 simulates the circuit requirements for starting a ground start or coin start line circuit. The test access concentrator circuit 10 is thus able to check the presence of a sparing line circuit 9 which is configured for ground start or coin start function. In this case, the ANI termination 17 is connected via relay contacts 25 and 27. This produces a ground connection required for starting the sparing line circuit 9. The central office main controller then detects whether or not the sparing line circuit 9 has been started and in response switches out the ANI termination 17 by closing relay contact 23 for connecting the DC termination and opening relay contacts 25 and 27. This produces a balanced line current required to complete coin start or ground start sparing line circuit starting protocols.

In a similar manner as discussed above with reference to the sparing line circuit 9, proper functioning and connection of the subscriber line interface circuit 3 may be ascertained by connecting the interface circuit 3 to the test access concentrator circuit 10 via relay contact 19 and to the DC termination 15, for routine testing. This causes the subscriber line interface circuit 3 to operate. If the line circuit does not operate, it is either defective or not connected to the central crosspoint switching matrix (not shown). If other line circuits on the same line card have the same problem, then the line card is not properly connected to the central crosspoint switching matrix. If not, then the original line circuit 3 is known to be defective. Maintenance software running on the central office main controller can make this a distinction.

It should be noted that the actual relays for operating the relay contacts have not been shown, since their structure would be clearly understood to a person skilled in the art understanding this invention, and particularly to close the contacts described in order to perform the function described herein. It should also be recognized that other means for closing the contacts can be used; for example instead of electromechanical relays, semiconductor switches can be used. The contacts are closed under control of a peripheral or main processor of the central switching system, which can be communicated with and controlled in a known manner to provide diagnostic testing by a technician at a remote location.

Turning now to FIG. 2, a schematic block diagram of the test access concentrator circuit 10 is shown in accordance with a preferred embodiment of the present invention.

DC termination 15 is shown connected to the LOOK IN BUS via tip and ring leads T and R through relay contacts 21A and 21B. The tip and ring leads T and R from the LOOK IN BUS are connected to a bridge rectifier comprised of diodes 35, 37, 39 and 41, for desensitizing the DC termination 15 to circuit polarity. This is useful for receiving ringing signals, line circuit current polarity reversals, and +48 volt transmission signals.

The tip lead is connected to the junction of series connected diodes 35 and 37, and the ring lead is connected to the junction of series connected diodes 39 and 41. The cathodes of diodes 35 and 41 are connected to a resistor 43 while the anodes of diodes 37 and 39 are connected to a resistor 45 bypassed by AC shunt capacitor 47. Resistors 43 and 45 form a voltage divider, their junction being connected to the base of, in one embodiment, an NPN transistor 49. The collector of transistor 49 is connected via a further resistor 51 to resistor 43 and the emitter of transistor 49 is connected via resistor 53 to resistor 45.

The DC termination 15 functions to provide a DC resistance of a predetermined value while at the same time presenting an open circuit to AC, forming a synthetic inductance. The DC termination draws DC bias current through a synthetic floating inductance from one of either the sParing line circuit 9 or the subscriber line interface circuit (SLIC) 3, whichever is connected thereto.

Transistor 49 is more preferably comprised of a Darlington transistor pair which is biased via the voltage divider comprised of resistors 43 and 45.

The capacitor 47 in the bias network acts as an AC short circuit for preventing the transistor 49 from affecting the AC load line impedance. The AC impedance of the DC termination 15 is established by resistor 43 in series with the parallel combination of capacitor 47 and resistor 45. According to a successful prototype the AC impedance exhibited a minimum value of 10K ohms. The DC load line impedance is generated by the transistor 49.

In operation, voltage divider resistors 43 and 45 in the bias network divide the input DC voltage carried by the tip and ring leads T and R by two (i.e. resistors 43 and 45 preferably are of equal value). Hence, half of the incoming DC voltage falls across resistor 53 in the emitter circuit of the transistor (disregarding the transistor junction voltage drops for simplicity). Thus, the current in the emitter circuit of transistor 49 is given by;

$$Id = (Vin/2)/R53,$$

where Vin is the DC voltage appearing across the tip and ring leads T and R, and R53 is the resistance of resistor 53.

The current Id is much greater than the bias resistor current. Thus the total DC current in the DC termination 15 is approximately equal to Id.

The DC resistance of the DC termination 15 is given by:

$$Rdc = Vdc/Idc,$$

But, $$Vdc = Vin,$$

and $$Idc = Id.$$

Thus, $$Rdc = Vin/Id$$
$$= Vin/((Vin/2)/R53)$$
$$= 2 \cdot (R53)$$

It is thus seen that the DC termination input resistance is simply a scaled value of resistor 53. Resistor 51 in the collector circuit is used simply to dissipate power, and the value thereof is chosen so as not to cause the DC termination 15 to saturate.

According to the preferred embodiment, it is desired that the DC termination 15 should draw at least 30 mA from the line circuits (e.g. SLIC 3 or sparing circuit 9).

The line circuits are current limiting at this value, (i.e. line circuits 3 and 9 fold back at 30 mA, with an internal resistance of 400 ohms, and an internal 4 volt voltage drop). Therefore, if the synthetic inductor provided by DC termination 15 is set up to draw 30 mA at minimum battery voltage, the internal operation of the line circuits will ensure that for all other battery voltages the output current will fold back to that produced by minimum battery voltage. The synthetic inductor is then set up to use the internal operation of the subscriber line interface circuit 3 or sparing line circuit 9 to draw the 30 mA current independently of the battery voltage.

The required maximum DC termination resistance for termination 15 is given by:

$$R = V/I$$

$$Rind + Rslic = (V_{batt} - 4V)/30 \text{ mA,}$$

(battery voltage being typically 42 volts)

$$Rind = (42 - 4)V/30 \text{ mA} - 400 \text{ ohms}$$
$$= 866 \text{ ohms}$$

where Rind designates the resistance of the termination circuit, and Rslic designates the internal resistance of the line circuit (3 or 9).

The current through resistor 53 should be 30 mA as discussed above. The voltage across resistor at minimum battery voltage is given by:

$$Vr = (Vin - 2 \text{ diode voltage drops})/2 - 2 \text{ diode voltage drops,}$$

where the diode voltage drops are due to the base emitter junction voltage drops of the transistor 49 which, as discussed above, is preferably configured as a Darlington transistor pair.

Thus, the voltage across resistor 53 is given by $$Vr = Vin/2 - 3 \text{ diode voltage drops}$$
$$= (42 - 4)/2 - 2.1 \text{ volts}$$
$$= 16.9 \text{ volts.}$$

Thus, the resistance of resistor 53 is given by $$R53 = 16.9 \text{ V}/30 \text{ mA}$$
$$= 563 \text{ ohms.}$$

As discussed above, the ANI termination 17 is required for testing circuits which detect ring ground, such as coin ground operated circuits, ground start PBX circuits, and tip party on party line ANI circuits. The ANI termination circuit 17 is provided for starting such types of line circuits.

In the successful prototype, resistors 29 and 33 were each chosen to be 1000 ohm resistors. Resistor 29 connected in the ring lead R is used for testing of ground start line circuits. In its idle state, a ground start line circuit applies battery voltage to its ring lead and opens its tip lead. The line circuit is seized by a PBX applying ground to its ring lead. The central office exchange then applies ground to its tip lead and the PBX terminates the tip and ring leads to produce a loop current. The PBX line is split and brought to the test access concentrator circuit 10 by means of the LOOK IN BUS. The termination relay contacts 25 and 27 are operated to connect the ANI termination 17 to the PBX line circuit. The PBX line circuit senses the ground reference voltage connected to resistors 29 and 33 through its ring lead. The PBX then applies dial tone and short circuits its tip lead to ground. The ANI termination 17 intrinsically has the tip lead connected to the ring lead and so will produce the loop current required by the PBX line for starting.

The hookswitch polarity detector circuit 13 is provided to determine presence of the sparing line circuit 9 as well as to indicate of whether or not the line circuit has been properly connected, as discussed above. A hybrid 55 is connected to tip and ring leads T and R of the LOOK IN BUS via relay contacts 57 and 59. The LOOK OUT BUS is connected to hybrid 55 via tip and ring leads T and R through further relay contacts 61 and 63 respectively. The hybrid 55 functions in combination with differential amplifier 65 to convert metallic (i.e. differential) currents on the tip and ring leads into a proportional voltage at the output of differential amplifier 65. Internally of the hybrid 55, feed resistors (not shown) are connected in series with both the tip and ring leads T and R from both the LOOK IN BUS and LOOK OUT BUS for converting the line currents to voltages. Those voltages are attenuated within hybrid 55 to values in the operating range of the differential amplifier 65. The differential amplifier 65 cancels the common mode currents and amplifies the metallic (i.e. differential) currents carried by the tip and ring leads, T and R.

The voltage appearing at the output of differential amplifier 65 may be either positive or negative depending on the direction of current flow within tip and ring leads T and R. The output of differential amplifier 65 is connected to the non-inverting inputs of comparators 67 and 69. Comparators 67 and 69 compare the output voltage from amplifier 65 with positive and negative reference levels designated as REVERSE REFERENCE and FORWARD REFERENCE respectively which are applied to the inverting inputs of comparators 67 and 69. In the event that a current of sufficient magnitude is present on the tip and ring leads, differential amplifier 65 generates a voltage sufficient to operate a predetermined one of the two comparators 67 and 69, depending on the battery polarity. According to the successful prototype, the output voltages from comparators 67 and 69 were referenced to $+/-12$ volt supply voltages. The outputs of the comparators are preferably level shifted via level shifter circuits 71 and 73 to 5 volt logic levels, and are thereafter transmitted to scan point terminals designated REVERSE CURRENT and FORWARD CURRENT for connection to the central office main controller (not shown).

As discussed above, the central office main controller detects the presence of reverse or forward current on the scan point terminals for ascertaining whether or not the sparing line circuit has been connected.

Polarity detection is also provided. The line circuit under test (i.e. SLIC 3 or sparing circuit 9) is split by its test access relay contact 5, and is connected to the test access concentrator circuit via one of either the LOOK OUT BUS or LOOK IN BUS. Relay contacts 75 and 77 are closed for connecting the tip and ring leads of the LOOK IN BUS to a voltage attenuator 79 for attenuating the battery line voltage of the line circuit into the operating range of an additional comparator 81. Normally, the battery voltages are dropped from $-48$ volts to approximately $-4$ volts via the voltage attenuator 79. The output voltage of the comparator 81 is controlled by the polarity of the line circuit battery voltage, and as discussed above in relation to comparators 69 and 67, is typically referenced to a $+/-12$ volt supply voltage. The output from comparator 81 is level shifted to a 5-volt logic level by circuitry within level shifter circuit 83, and the logic level output signal is transmitted to a POLARITY terminal scan point for further testing and analysis by the central office main controller as discussed above.

In summary, the test access concentrator circuit 10 provides an indication of whether or not the sparing line circuit 9 (or SLIC 3) is detected, and if so whether the circuit has been connected with correct polarity. The indication signal is retrievable from a remote location by means of a data link, etc., connected to the main controller in a well known manner. Thus, the sparing line circuit may be tested periodically to insure proper functioning, prior to any requirement for connecting the sparing line circuit to a remote subscriber set in the event of a defective subscriber line interface circuit. Consequently, great savings in maintenance man-hour costs are obtainable by means of periodic checking of the sparing line circuits from a remote location without requiring a skilled technician to make an unscheduled trip to the central office exchange, which as noted earlier may be several hundred miles from the test center.

A person understanding the present invention may conceive of other embodiments of variation therein. All such embodiments or variations are believed to be within the sphere and scope of the present invention as defined in the claims appended hereto.

I claim:

1. Apparatus for testing a sparing line circuit adapted for connection to a communication system, comprised of:
    (a) first means for receiving and terminating battery current supplied by said sparing line circuit,
    (b) second means for detecting the presence of said battery current received and terminated by said first means and in response generating a first signal representative thereof for detection by the communication system, and
    (c) third means for detecting the direction of flow of said battery current and in response generating a second signal representative thereof for detection by the communication system,
    whereby the operational presence of said sparing line circuit can be determined by the communication system.

2. Apparatus as defined in claim 1, wherein said second means is further comprised of:
    (a) a differential amplifier for receiving said battery current and in response generating an output voltage proportional thereto, and
    (b) a pair of comparators for receiving and comparing said output voltage to positive and negative threshold voltages applied to respective inputs thereof, and in response generating respective forward and reverse signals for indicating the presence of either forward or reverse battery current.

3. Apparatus as defined in claim 2, wherein said third means is comprised of:
    (a) input resistor means for receiving and conducting said battery current and in response developing a further voltage thereacross, and (b) a further comparator for receiving and comparing said further voltage to a DC ground reference voltage and in response generating said second signal indicative of the direction of flow of said battery current.

4. Apparatus as defined in claim 1, 2 or 3, wherein said first means is comprised of a DC termination circuit for sinking said battery current via a synthetic inductance.

5. Apparatus as defined in claim 1, 2 or 3, wherein said first means is comprised of an ANI termination circuit for connecting said sparing line circuit to DC ground in the event said line circuit is configured for ground start.

6. Apparatus as defined in claim 1, 2 or 3, wherein said first means is a DC termination comprised of:
(a) means for rectifying said battery current flowing in tip and ring leads of said sparing line circuit,
(b) a voltage divider for receiving said battery current from said bridge rectifier and in response generating a control voltage equal to one-half the voltage across said tip and ring leads,
(c) a Darlington transistor pair for receiving said control voltage and in response conducting said battery current via a predetermined resistance, and
(d) means connected to said voltage divider and said Darlington transistor pair for shunting AC components of said control voltage to ground.

7. A method for testing a sparing line circuit adapted for connection to a communication system, comprising the steps of:
(a) receiving and terminating battery current supplied by said sparing line circuit,
(b) detecting the presence of said battery current and in response generating a first signal representative thereof, and
(c) detecting the direction of flow of said battery current and in response generating a second signal representative thereof,
whereby said first signal provides an indication of whether or not said sparing line circuit is connected to said communication system, and said second signal provides an indication of whether or not said sparing line circuit has been connected with correct polarity.

8. A method as defined in claim 7, further comprising the steps of:
(a) receiving said battery current and in response generating an output voltage proportional thereto, and
(b) receiving and comparing said output voltage to positive and negative threshold voltages and in response generating respective forward and reverse signals for indicating the presence of either forward or reverse battery current.

9. A method as defined in claim 8, further comprising the steps of:
(a) receiving and conducting said battery current and in response generating a further voltage, and
(b) receiving and comparing said further voltage to a DC ground reference voltage and in response generating said second signal indicative of the direction of flow of said battery current.

10. A method as defined in claim 7, 8 or 9, further comprising the steps of:
(a) rectifying said battery current flowing in tip and ring leads of said sparing line circuit,
(b) receiving said rectified battery current and in response generating a control voltage equal to one-half the voltage across said tip and ring leads,
(c) receiving said control voltage and in response conducting said battery current via a predetermined resistance, and
(d) shunting AC components of said control voltage to ground.

11. A communication system comprised of line circuits, at least one sparing line circuit, means for substitution of the sparing line circuit in place of a faulty one of the line circuits, and automatic means for testing the operability of the sparing line circuit prior to said substitution.

12. A system as defined in claim 11 in which the automatic means includes means for terminating the sparing line circuit and for testing for the presence of line current supplied by the sparing line circuit.

13. A system as defined in claim 12 including further means for testing the polarity of said line current.

14. A system as defined in claim 11, 12 or 13 including scan points and means for providing signals indicating the operability of the sparing line circuit to said scan points for detecting by a processor.

* * * * *